Inventor:
IVAR JEPSON
By: George R. Clark
Atty

Oct. 10, 1961     I. JEPSON     3,003,300

POWER LAWN MOWER

Original Filed Oct. 22, 1954     8 Sheets-Sheet 3

Inventor.
IVAR JEPSON
By: George R. Clark
Atty

Oct. 10, 1961  I. JEPSON  3,003,300
POWER LAWN MOWER
Original Filed Oct. 22, 1954  8 Sheets-Sheet 5

Inventor:
IVAR JEPSON
By: George R. Clark
Atty

Oct. 10, 1961 — I. JEPSON — 3,003,300
POWER LAWN MOWER
Original Filed Oct. 22, 1954 — 8 Sheets-Sheet 7

Inventor:
IVAR JEPSON
By: George R. Clark
Atty.

United States Patent Office 3,003,300
Patented Oct. 10, 1961

3,003,300
POWER LAWN MOWER
Ivar Jepson, Oak Park, Ill., assignor to Sunbeam Corporation, Chicago, Ill., a corporation of Illinois
Original application Oct. 22, 1954, Ser. No. 464,020, now Patent No. 2,886,934, dated May 19, 1959. Divided and this application Aug. 25, 1958, Ser. No. 756,750
11 Claims. (Cl. 56—26)

The present invention relates to power driven lawn mowers, and more particularly to power driven lawn mowers of the type using a prime mover such as an internal combustion engine or the like for providing the driving power for the cutting mechanism as well as the driving power for moving the lawn mower over the area to be mowed. Specifically, the present invention is a division of copending application Serial No. 464,020, filed October 22, 1954, now Patent No. 2,886,934.

In recent years the power driven lawn mower has come into extensive use so that in any city or village a large number of them are used even on relatively small lawns. Some years ago the power lawn mower was only used by those who had very large lawns or for applications such as golf courses, cemeteries, parks and the like. However, the power lawn mower has been developed so that it is relatively inexpensive and is adapted to be maneuvered just like a hand lawn mower, so that now many city dwellers who have relatively small lawns to mow use such power lawn mowers. It is expected that the power mower will come into even more extensive use. Unfortunately, most of the power lawn mowers on the market today were not engineered for power operation but were more or less developed like "Topsy" by adding a prime mover to a conventional lawn mower and then making certain changes to interrelate the cutting means and the prime mover. Due to the great increase in demand for power driven lawn mowers, a great many manufacturers of such power driven lawn mowers have sprung up, so that there are literally hundreds of manufacturers of power driven lawn mowers in existence today. These manufacturers are really assemblers in the majority of cases, since they purchase a cutter unit and a power unit and then apply various controls and the like to make a lawn mower. It will be appreciated that to have an efficient, smooth running, power operated lawn mower, the mower should be designed from beginning to end for power operation, and the entire unit must be properly engineered. A power operated lawn mower should cut a smooth, even strip without the requirement on the part of the operator of concentrating on clutch levers, knobs and the like. Moreover, a power operated lawn mower should include power means for driving the lawn mower over the area to be cut, as well as to drive the cutting mechanism, and the application of power to the driving wheels should be controlled in a simple and easy manner so that maximum maneuverability is possible with a minimum effort on the part of the operator.

Prior to the present invention, there were not available on the market prime movers for powering such lawn mowers which were sufficiently light in weight to provide an overall lawn mower of light weight. As a result, with the heavy prime movers which were available prior to the present invention, it was necessary to have very heavy frames, and, as a consequence, the entire mower of the power operated type was much too heavy and was very difficult to manipulate, particularly in a size satisfactory for use on the conventional city lawn. Of course, where a very large mower was necessary which could be of the type where the operator could ride on the mower, the weight of the mower was not as important. However, the great bulk of the lawn mowers sold today are the type that are intended for use on medium to small sized lawns, and the weight of the mower is a very important factor. It would be desirable to provide a power operated lawn mower in which both the power unit as well as the mower itself is much lighter in weight than those available heretofore.

Power operated lawn mowers have been provided with means for driving both the cutting means and the ground wheels for the lawn mower, whereby the mower is driven over the area to be cut. To accomplish this, a complicated clutching means was necessary for clutching the prime mover to the ground wheels and also in many cases to clutch the prime mover to the grass cutting means. It would be desirable to provide a very simple arrangement whereby the cutting means and the means for propelling the lawn mower over the area to be cut can be connected to the prime mower with the simplest form of mechanism involving not more than a simple chain drive or a simple belt drive in each case without complicated clutch mechanisms, reversal mechanisms and the like. Additionally, it would be desirable to provide a simple arrangement whereby the power is applied to the drive wheels in a smooth manner without any jerks or the like thereby permitting the mower to be smoothly and easily guided around obstructions in the same manner as one would operate a hand mower, except that a source of power for driving the same over the area is available whenever desired, and which source of power may be rendered ineffective as far as driving the ground wheels is concerned at any time.

In designing a power operated lawn mower, it is essential to start out with several basic factors. For example, when the mower is to be driven over an area to be cut, a certain speed for driving the device over the area must be chosen. It has been found that a maximum of about three miles per hour through medium to heavy grass would be a satisfactory speed. Thus, one of the first requirements is to design a power lawn mower in which the ground wheels are driven by the prime mover at a speed such that the mower travels along the ground at about three miles per hour. For slower speeds, of course, the throttle can be set back, but an internal combustion engine becomes less efficient when the speed is cut down by reducing the gas supply. Another problem in the design of a power operated lawn mower is to determine the number of cuts to be made per unit length of travel. For a reel type mower it has been found desirable that there should be at least one cut per inch of travel. The number of blades for a reel type mower must be chosen, and then the speed of rotation to give the number of cuts per inch can be determined. Every prime mover of the internal combustion engine type has a crankshaft and a camshaft, which, for at least one type of engine, has the camshaft operating at a different speed from that of the crankshaft and also with a different direction of rotation. It would be desirable to utilize both the camshaft and the crankshaft to drive a power lawn mower thereby eliminating complicated reduction gear mechanisms and simplfying the transmission means between the prime mover and the two means to be driven.

In power operated lawn mowers on the market today, it is common practice to provide a rigid frame with means to take the frame apart when inserting and removing the reel; for example, in the case of a reel type lawn mower. It would be desirable to provide a rigid frame for a power operated lawn mower in which the frame is an integral unit which never need be taken apart.

Accordingly, it is an object of the present invention to provide a new and improved power driven lawn mower having the desirable features noted above.

It is another object of the present invention to provide an improved power driven lawn mower with novel means for applying power from the prime mover to the drive wheels which propel the mower over the area to be mowed.

It is a further object of the present invention to provide a power operated lawn mower with an internal combustion engine for a prime mover in which the crankshaft is drivingly connected to one portion of the lawn mower to be driven and the camshaft of the internal combustion engine is drivingly connected to another and different portion to be driven.

It is a further object of the present invention to provide a new and improved power driven lawn mower in which power is supplied to the drive wheels of the mower by merely pushing downwardly on the mower handle.

It is another object of the present invention to provide an improved cutting mechanism for a power operated lawn mower which is simple to adjust in any desired manner.

It is another object of the present invention to provide in a power operated lawn mower an improved overload control means.

It is another object of the present invention to provide a power operated lawn mower in which the driving connection between the mower and the reel involves a simple drive mechanism comprising either a belt or chain drive with a simple pulley or gear associated with the prime mover, and a simple pulley or gear associated with the cutting mechanism, and furthermore in which a similar simple driving mechanism is provided between the driving means and the means for driving the ground wheels of the mower.

It is another object of the present invention to provide an improved pulley arrangement for a power operated lawn mower.

Still another object of the present invention resides in an improved power transmission arrangement for a power operated lawn mower in which the engine screen is kept clean by the driving means.

Further objects and advantages of the present invention will become apparent as the following description proceeds, and the features of novelty which characterize the invention are pointed out with particularity in the claims annexed to and forming a part of this specification.

Briefly, the present invention is concerned with a power operated lawn mower of the reel type in which an internal combustion engine is mounted on the lawn mower frame. The camshaft of the internal combustion engine is directly connected through a simple chain and gear drive with the reel, while the crankshaft of the internal combustion engine is simply connected by a belt and pulley arrangement to a pair of friction rollers which are selectively engageable with the ground wheels of the mower thereby providing power drive of the ground wheels when it is desired and providing so-called free wheeling when the power drive is not desired. The friction rollers are associated with the handle so that relative movement of the handle and the mower frame causes the selective application of power to the wheels or the removal of power from the wheels. The lawn mower includes improved means for adjusting the height of the cutter bar, and the entire power operated lawn mower is designed to provide a lightweight, smooth running mower which permits the operator to cut a smooth, even strip without the requirement that he concentrate on clutch levers, knobs, controls and the like.

For a better understanding of the present invention reference may be had to the accompanying drawings in which.

Figure 1:
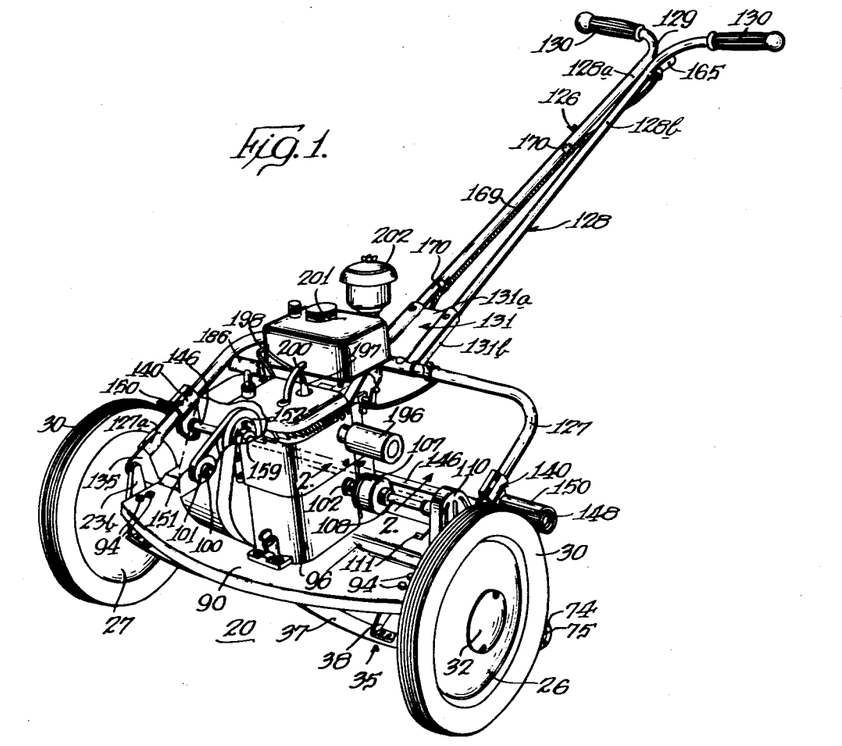
FIG. 1 is a perspective view of a power operated lawn mower embodying the present invention.
Figure 2:
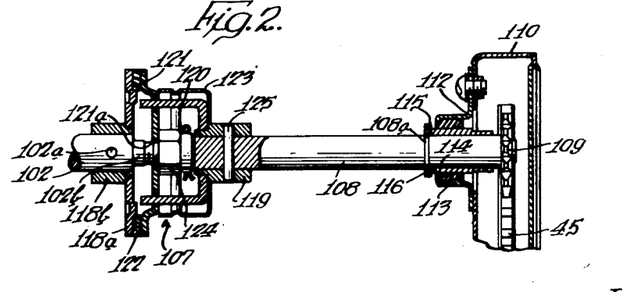
FIG. 2 is an enlarged sectional view taken substantially on line 2—2 of FIG. 1.
Figure 10:
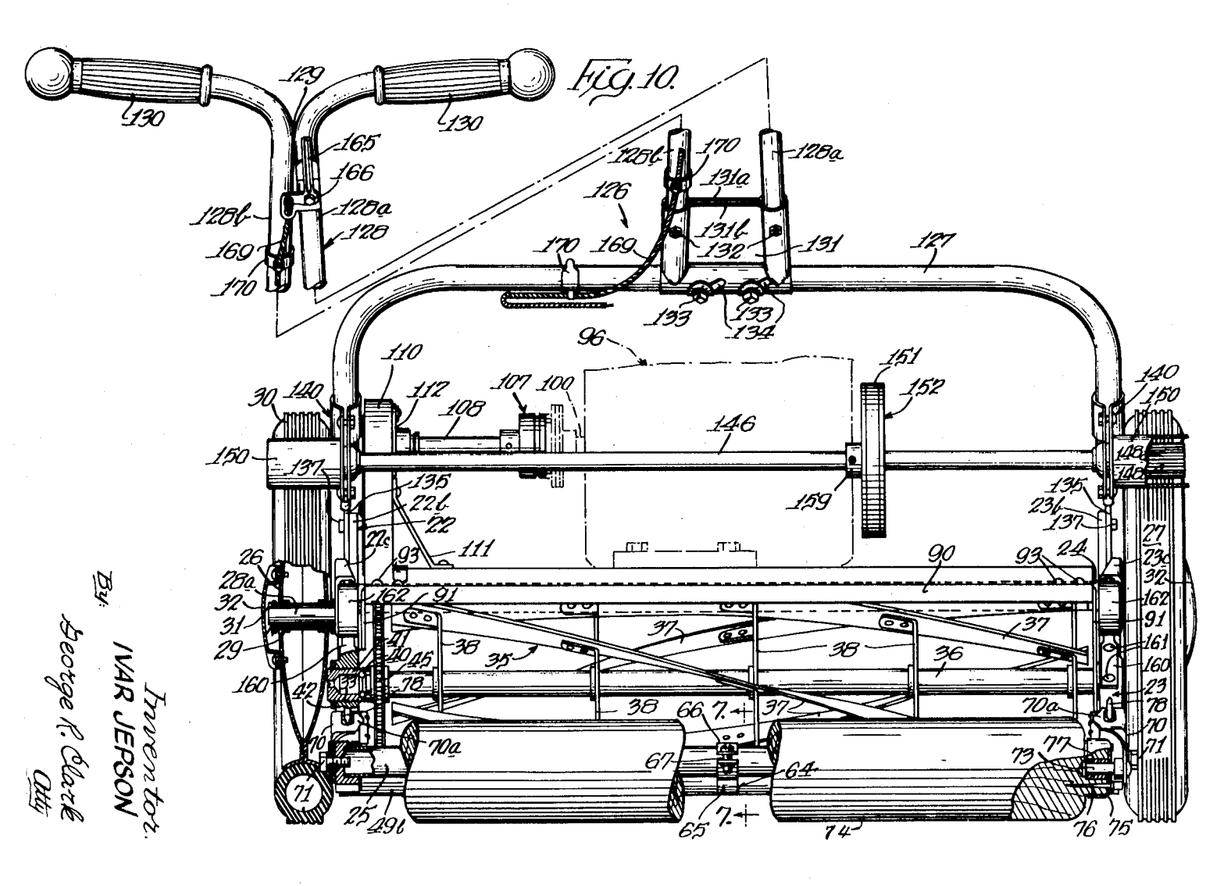
FIG. 10 is an enlarged view of the lawn mower of FIG. 1 looking at it from the rear, with certain portions cut away better to illustrate various details of the present invention.
Figures 11, 18:
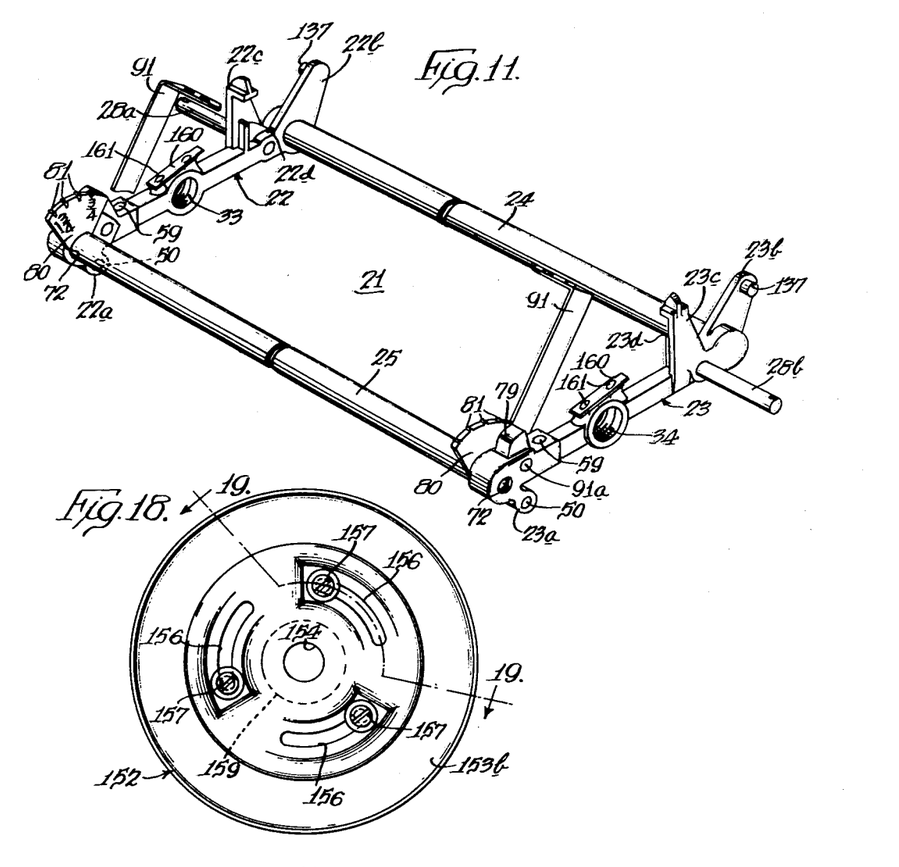
FIG. 11 is a perspective view of the lawn mower frame of the present invention.
FIG. 18 is an elevational view of a pulley employed in the lawn mower of the present invention.
Figure 12:
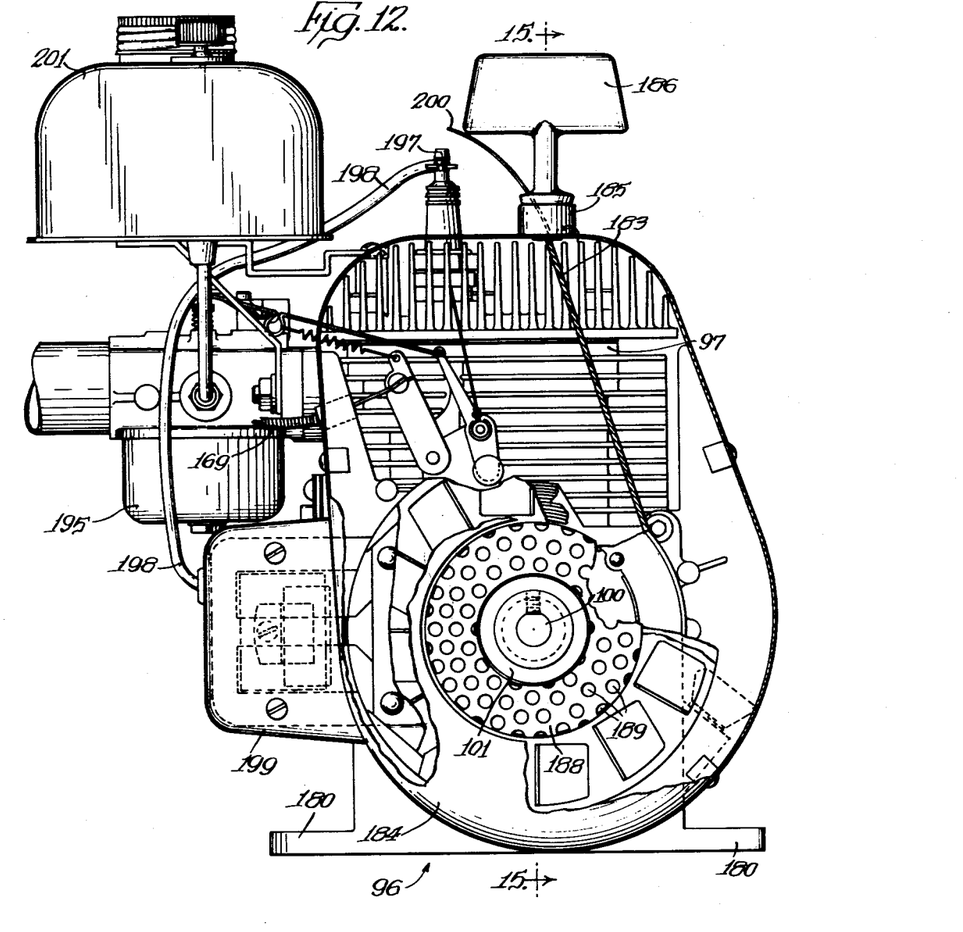
FIG. 12 is a greatly enlarged side elevational view with certain portions cut away of the internal combustion engine employed with the lawn mower of the present invention.

Referring now to the drawings and considering first FIGS. 1 to 11 thereof, the power operated lawn mower of the present invention, generally designated by the reference numeral 20 in FIG. 1 of the drawings, comprises a frame assembly 21 as shown in FIG. 11 of the drawings, which frame assembly is defined by a pair of end castings 22 and 23 interconnected by a front tubular frame member 24 and a rear tubular frame member 25, respectively, thus defining a rigid frame. The frame end members 22 and 23 are preferably provided with recesses for receiving the ends of the tubular frame members 24 and 25, respectively. These ends of the tubular frame members 24 and 25 are then welded or otherwise integrally secured in the recesses in the end frame members 22 and 23 to provide the very rigid frame assembly 21 and at the same time a very lightweight frame assembly. Thus, there is provided a frame assembly 21 which is very strong and yet of very light weight.

For the purpose of supporting the frame assembly on suitable ground wheels, there are provided the ground wheels 26 and 27, the ground wheel 26 being associated with the frame end 22, while the ground wheel 27 is associated with the frame end 23. To relate the ground wheels 26 and 27 with the frame assembly 21, the frame end 22 is provided with a stub axle 28a, while a similar stub axle 28b projects from the frame end 23. The wheels 26 and 27 are provided with suitable bearings such as indicated at 29 in FIG. 10 of the drawings. The ground wheels 26 and 27 are held on the stub axles 28a and 28b by a cotter key such as 31 shown in connection with the ground wheel 26 in FIG. 10 of the drawings. Suitable hub caps 32 are preferably also provided to improve the appearance and to shield the cotter key 31. In this way the ground wheels 26 and 27, which have been illustrated as disc wheels, present a rather pleasing appearance. Each of the ground wheels 26 and 27 is also illustrated as having mounted thereon a rubber tire 30, which is preferably of the semi-pneumatic type.

It will be appreciated that in recent years power lawn mowers have involved two types: the so-called reel type power lawn mower, and the so-called rotary blade type power lawn mower. The present invention in many aspects is adapted to be used with either type of lawn mower, but it has been specifically illustrated as applied to the so-called reel type mower. As illustrated in the drawings, there is provided a reel 35 which comprises a conventional reel shaft 36, a plurality of blades 37 and a plurality of spiders or supports 38. The spiders or supports 38 are spaced along the longitudinal length of the shaft 36 and are suitably secured thereto and to the blades 37 to provide the conventional reel commonly employed with reel type lawn mowers. As indicated in the drawings, the spiders 38 are secured to the blades 37 by rivets or the like. The ends of the reel shaft 36 are rotatably mounted in suitable bearings 40 which are supported in the respective frame end castings 22 and 23 of the frame assembly 21. Only one of these bearings is visible in the drawings and is best shown in FIG. 10. It is there illustrated as an adjustable bearing member 41 which is suitably supported within an opening 33 defined within the end casting 22. A similar opening 34, also clearly shown in FIG. 11 of the drawings, will accommodate the bearing for the other end of the reel shaft 36. These openings are threaded to accommodate the adjustable bearing members 41. To maintain the adjustable bearing members 41 in proper relationship, an adjusting nut 42 is provided for each adjustable bearing.

In order to apply power to the reel shaft 36 to cause rotation of the reel 35, a suitable sprocket 44 is secured to one end of the reel shaft 36. This sprocket 44 is indicated at the end of the reel shaft 36 adjacent the end frame 22, although, obviously, it could be disposed at either end. Moreover, this sprocket 44 is adapted to be connected by means of a sprocket chain 45, as is described in greater detail hereinafter with a source of power to cause rotation of the reel 35. The reel 35 is illustrated as a reel having five blades 37, and, as will become apparent from the following description, the sprocket 44 is chosen to have such a diameter in cooperation with a driving sprocket described hereinafter to cause a minimum of one cut per inch of travel of the lawn mower 20 over the area being mowed.

Figures 4, 5:
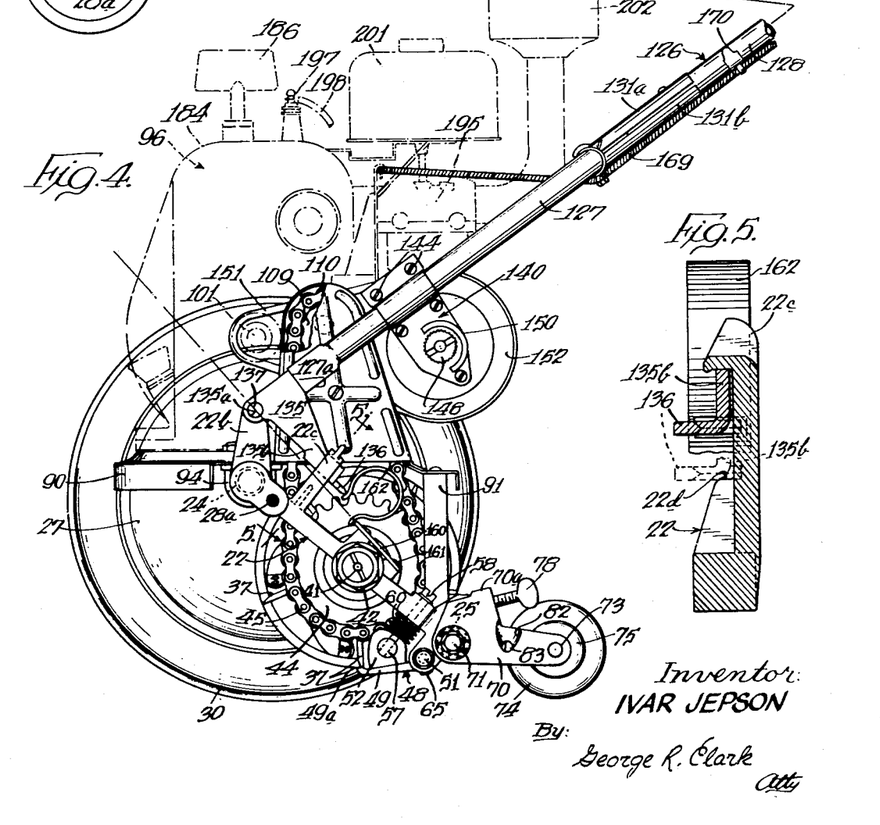
FIG. 4 is an enlarged end view of the lawn mower of FIG. 1 shown in the no-drive position with one ground wheel removed to permit easier viewing of the mechanism, and with the prime mover shown in phantom or in dashed lines.
FIG. 5 is an enlarged sectional view taken on line 5—5 of FIG. 4.
Figure 6:
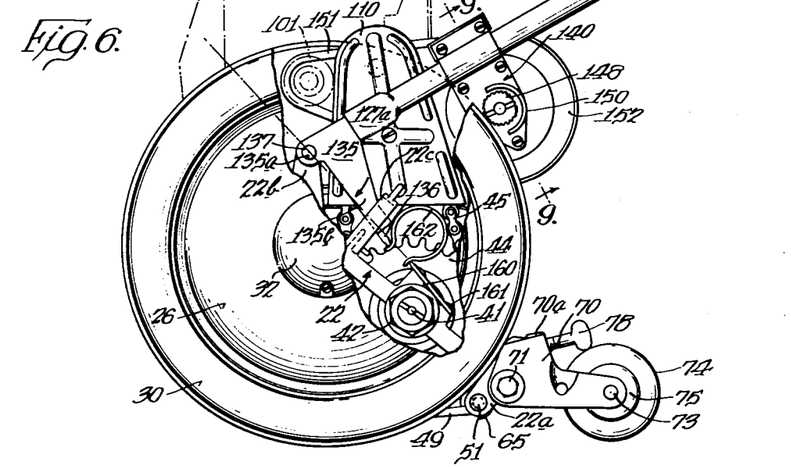
FIG. 6 is a partial end view similar to FIG. 4 (but in the drive position) with the ground wheel of that end in place and portions thereof cut away better to show the drive connection of the ground wheels and the prime mover.

For the purpose of cooperating with the reel 35 to perform a grass cutting operation, there is provided a shearing blade assembly, generally designated by the reference numeral 48, which shearing blade assembly comprises a shear blade 49 extending parallel with the reel shaft 36 and disposed in a position along the reel 35 so that the blades 37 move across the shear blade 49 in shearing engagement with a shearing surface 49a thereof. As illustrated best in FIG. 7 of the drawings, the shear blade 49 is provided with an upturned end defining the shearing surface 49a, which shearing surface is adapted to be engaged by the blades 37. In FIG. 4 of the drawings one of the shear blades 37 is illustrated as in shearing engagement with the shear surface 49a of the shear blade 49.

For the purpose of securing the shear blade 49 in cooperative cutting position relative to the reel 49, the shear blade includes a tubular section remote from the cutting surface 49a thereof which is designated by the reference numeral 49b. This tubular portion permits pivotal mounting about the axis of the tubular portion to permit the shear blade to move toward and away from the blades 37 of the reel 35. To this end the frame ends 22 and 23 are provided with integral extensions 22a and 23a, respectively, each of which includes an opening 50 therein aligned with each other and with the opening in the tubular portion 49b of the shear blade 49. A suitable pivot pin 51 is inserted into each end of the tubular portion 49b of the shear blade 49 and through the openings 50 in the extensions 22a and 23a. Thus, the shear blade 49 is pivotally secured to the frame assembly 21 in a manner so that the cutting surface 49a thereof can be moved toward and away from the blades 37 of the reel 35.

Figure 7:
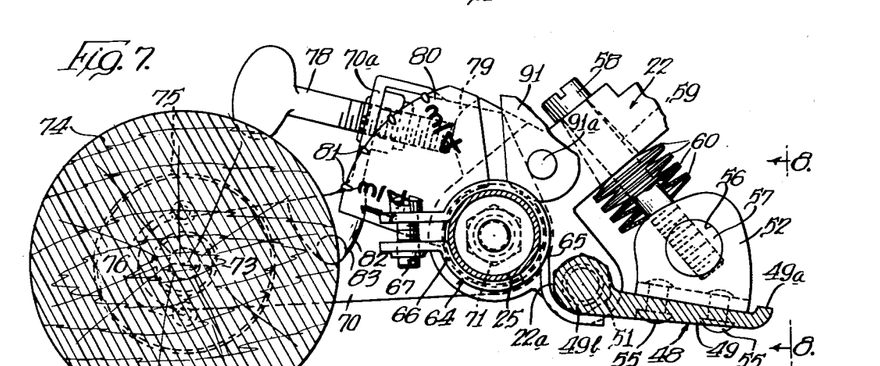
FIG. 7 is a greatly enlarged sectional view taken through the ground roller and cutter bar of the lawn mower of the present invention, and specifically along line 7—7 of FIG. 10.
Figure 8:
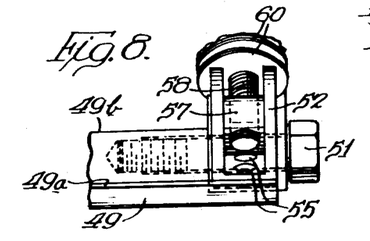
FIG. 8 is a view looking in the direction of the arrows 8—8 of FIG. 7, assuming that FIG. 7 shows the complete structure.
Figure 9:
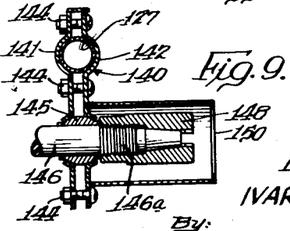
FIG. 9 is an enlarged fragmentary sectional view taken on line 9—9 of FIG. 6.

As is conventional in reel type lawn mowers, it is necessary that the shear blade 49 be adjustable relative to the reel blades to insure proper cutting action and also to maintain such adjustment once it is obtained. In accordance with the present invention, there are provided the shear brackets 52, one at either end of the shear blade 49 which are secured to the shear blade 49 by rivets 55 or any other suitable means. As best illustrated in FIGS. 7 and 8 of the drawings, the shear brackets 52 are of somewhat U-shaped configuration with aligned openings 56 in the arms of the U to receive therein a suitable adjusting pin 57, one adjusting pin being associated with each shear bracket 52, and hence, since two shear brackets are provided, two adjusting pins are provided, one at either end of the shear blade 49. The adjusting pins 57 are each provided with a tapped opening for receiving an adjusting screw 58, which adjusting screw 58 extends through a suitable opening 59, one such opening 59 being defined in each of the frame end members 22 and 23, respectively. The opening 59 in the frame end member 22 is visible in FIG. 7 of the drawings, and both openings 59 are visible in FIG. 11 of the drawings. These openings 59, as is evident from FIG. 7 of the drawings, are somewhat conical in shape to permit relative angular movement of the fastening means 58 for various adjustments of the shear blade 49. In accordance with the present invention, only a single adjusting screw 58 is necessary at each end of the shear blade 49 instead of the two screw arrangements conventionally employed with the reel type lawn mowers in use today. To take the place of the additional screw, there is compressed between each frame member such as 22 and 23 and the associated shear blade brackets 52 a plurality or stack of spring washers 60. These spring washers are compressed between the frame members 22 or 23, as the case may be, and the associated shear brackets 52 to bias the shear blade 49 away from the cutting blades 37 of the reel 35. By manipulating the screws 58 in one direction, the shear blade 49 is drawn upwardly, as viewed in FIG. 7 of the drawings, toward the blades 37 of the reel 35 against the force of the spring washers 60 arranged concentrically with the screws 58 and stressed in compression. Upon releasing these screws 58, the spring washers 60 will move the shear blades 49 in the opposite direction to an extent determined by the manipulation of the screw 58. The washers 60 are capable of producing a very large force and maintain the shear blade 49 in an accurately positioned manner relative to the reel 35. By the provision of the conical opening 59 in the frame ends 22 and 23, respectively, for accommodating the screws 58, the different angular positions of the shear blade 49 can readily be accommodated, which necessitates somewhat different angular positions of the adjusting screws 58.

It is essential, of course, that the shear blade be in contact with the reel blades 37 along the entire length thereof to insure accurate cutting action. For a lawn mower having a reel of twenty or more inches in length, there is a problem of obtaining sufficient rigidity in the shear blade such as 49 to insure that the central portion thereof will remain in the same plane as the end portions thereof. For the purpose of increasing the rigidity, and specifically for insuring that the central portion of the shear blade 49 will remain in good shearing engagement with the blades 37 when the ends thereof are in such shearing engagement with the corresponding blades, there is provided a tension bracket assembly, generally indicated at 64, comprising a tension lever 65, preferably formed of annealed spring steel. This tension lever 65, together with a tension bracket 66 is clamped to the frame assembly, and specifically is clamped to the tubular frame member 25 at the central portion thereof by means of a screw 67. The end of the tension lever 65 remote from the tubular frame 25 engages the underside of the shear blade 49 and tends to bias the shear blade in an upward direction, as viewed in FIGS. 7 and 10 of the drawings, to insure that the central portion of the shear blade 49 is in good shearing engagement with the blades 37. Thus, the shear blade 49 is related in a simple manner to the tubular frame 25 as far as supporting the central portion thereof is concerned, and a substantial force is applied in an upward direction to the central portion of the shear blade 49 regardless of the particular angular adjustment of the shear blade 49 relative to the cutting blades 37.

In a reel type lawn mower, there is usually provided a ground roller which controls the height of the cut by effectively determining the level of the shear blade 49 above the ground. In the lawn mower 20, there is employed a similar arrangement, and to this end there are provided a pair of ground roller brackets 70 pivotally mounted by pivot means 71 to the frame assembly 21. As indicated in FIG. 11 of the drawings, the end frame members 22 and 23 are provided with suitable openings 72 to receive the pivot means 71. Each of the brackets 70 is provided with a ground roller engaging pin 73, which pins 73 project toward each other so as to provide a pivotal support for a suitable ground roller 74 which may be formed of wood, rubber, plastic or the like. In order to provide a satisfactory bearing for the ground roller 74, the ends of the roller preferably are formed of a somewhat reduced diameter to accommodate roller end cups 75 which may be secured in any suitable manner to the roller 74. In the event that the roller 74 is made of wood, as indicated in the drawings, the end cup 75 may be secured thereto by suitable fastening means 76 which may be some form of nail or the like. A suitable bearing 77 may be provided at each end of the roller 74 to engage the bearing pins 73.

To maintain the ground roller bracket 74 in a predetermined position about the pivot pins 71, and moreover about the openings 72 in the frame end members 22 and 23, respectively, thereby to control the height of the cut, each roller bracket 70 is provided with a lateral flange 70a for accommodating a thumb screw 78 threaded therein in any suitable manner. Moreover, the end frame members 22 and 23, as best shown in FIG. 11 of the drawings, are provided with an integral portion defining a surface 79 engageable by the thumb screw 78. Thus, by adjusting the thumb screw 78, the particular relative angular position of the end brackets 70 is determined and the height of the cut is likewise determined.

To give an indication of the height of the cut so that the operator may know what he is doing without actually measuring the height of the shear blade 49 above the ground, each frame member 22 and 23 is provided with an integral arcuate portion designated at 80 which is provided with suitable raised indications 81 which indicate different heights of the cut. The limits of the cut shown as a maximum of "1¾" inches and a minimum of "¾" of an inch may be indicated on the frame assembly 21.

The indications 80 cooperate with a suitable indicia on the brackets 70 so that the operator may readily obtain any desired adjustment merely by setting the brackets at one of the desired adjustments. Preferably, each of the roller brackets may be provided with a suitable recess 82 and an opening 83 to receive suitable means for securing a grass catcher or the like to the rear of the lawn mower in a well-known manner.

From the arrangement described thus far, there has been provided a frame supported on ground wheels and a reel type cutting mechanism with means for adjusting the height of the cut and the like. In order that the prime mover may be associated with the lawn mower, it is necessary that a suitable mounting plate or the like be provided, and to this end there is provided a motor mounting plate 90 which is suitably supported by the frame assembly 21. The rear portion of the motor mounting plate 90 is supported from the frame assembly 21 by a pair of L-shaped mounting plate brackets 91. These L-shaped mounting plate brackets have the lower ends thereof riveted or otherwise secured, as indicated at 91a, to the frame ends 22 and 23, respectively, in a manner so that the arms of the L not secured to the frame are disposed in a substantially horizontal plane. Moreover, these arms are secured to the motor mounting plate 90 by suitable rivets or other fastening means. The front portion of the motor mounting plate 90 may rest on the tubular frame member 24 and is illustrated as being secured thereto by a pair of U bolts 94 which embrace the tubular frame member 24 and extend through openings in the motor mounting plate. Effectively, therefore, the motor mounting plate 90 becomes an integral part of the frame assembly 21 of the lawn mower.

Figure 13:
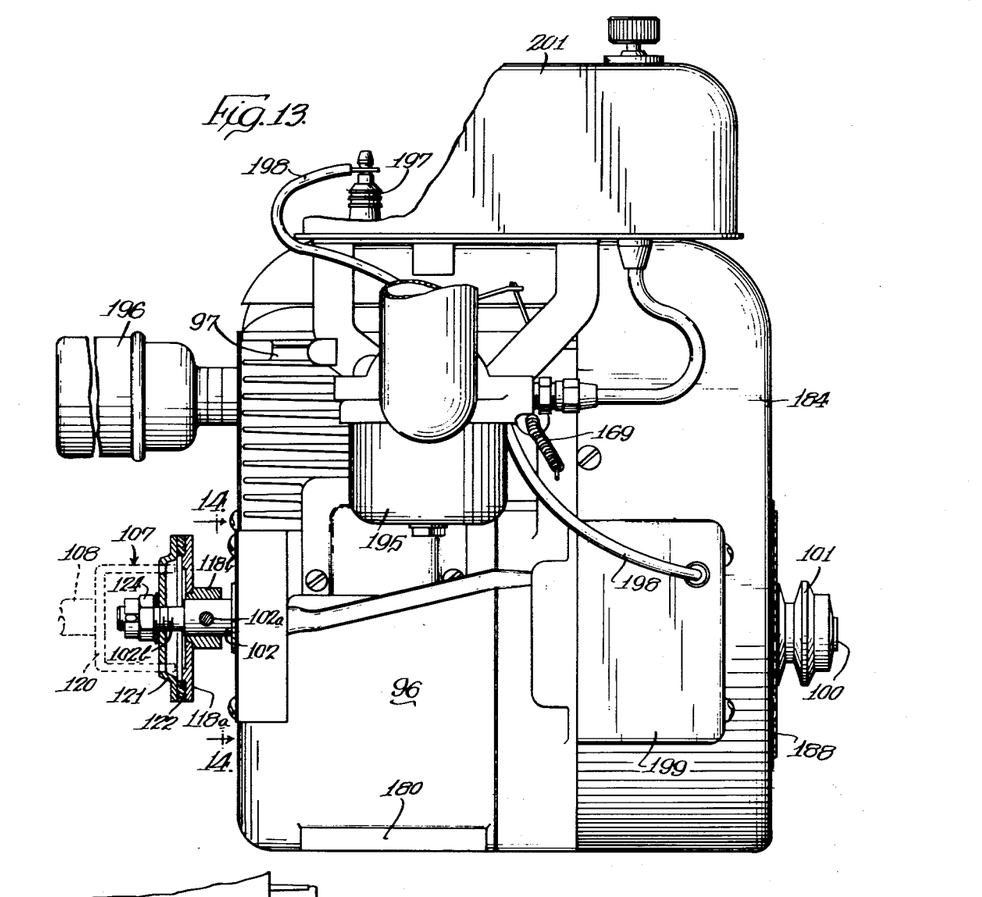
FIG. 13 is a left side view of FIG. 12 with certain portions shown in section and other portions thereof cut away better to illustrate details of the invention.
Figure 14:
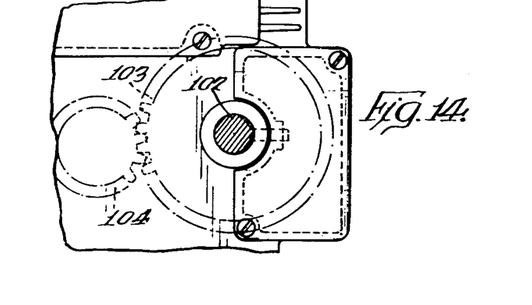
FIG. 14 is a sectional view taken on line 14—14 of FIG. 13 to illustrate the gear relationship between the crankshaft and the camshaft of the internal combustion engine employed in connection with the lawn mower of the present invention.
Figures 15, 16, 17:
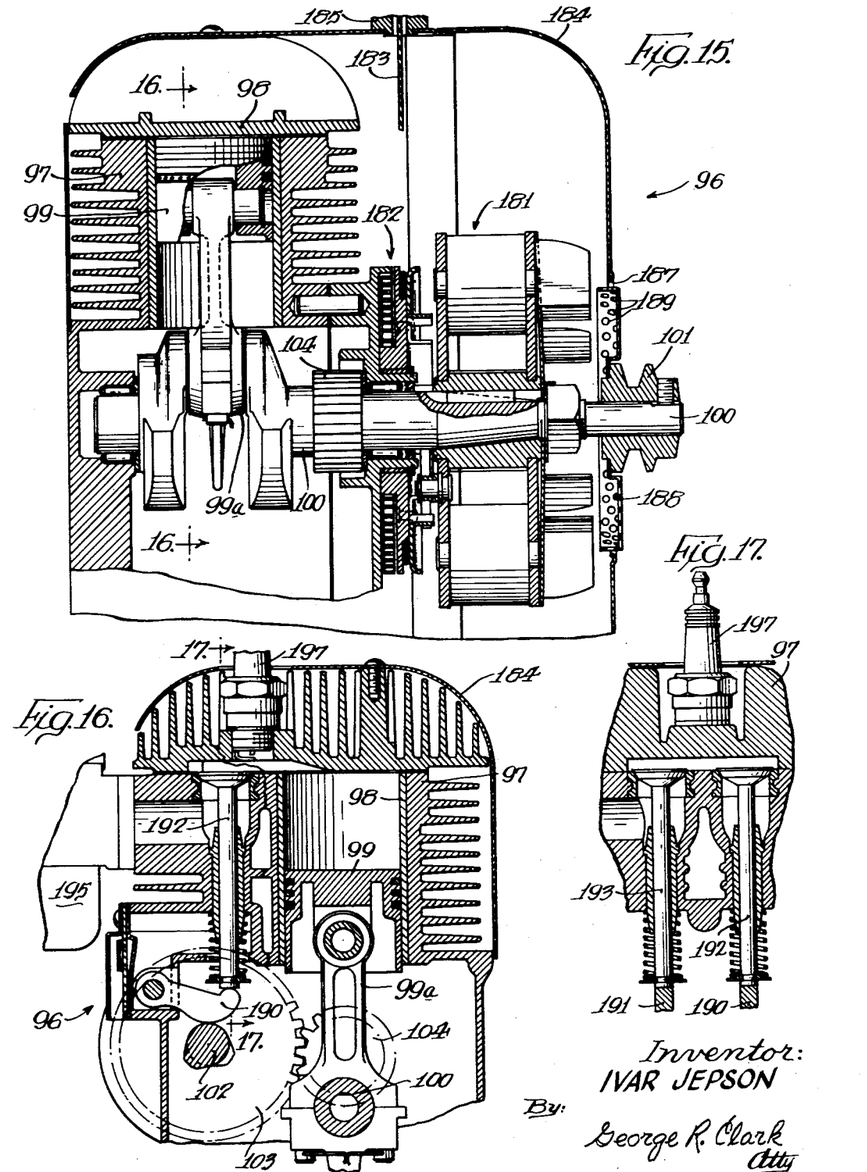
FIG. 15 is a substantially enlarged partial sectional view taken on line 15—15 of FIG. 12, assuming that FIG. 12 shows a complete structure.
FIG. 16 is a sectional view taken on line 16—16 of FIG. 15, assuming that FIG. 15 shows the complete structure, but with the crankshaft and piston in a different position.
FIG. 17 is a sectional view taken on line 17—17 of FIG. 16, again assuming that FIG. 16 shows the complete structure.

Suitably supported on the motor mounting plate 90 is a prime mover specifically illustrated as an internal combustion engine 96. The details of the internal combustion engine insofar as the present invention is concerned are best disclosed in FIGS. 12 to 17, inclusive, and are described in greater detail hereinafter. Also, as will become apparent from the ensuing description, the internal combustion engine 96 employs a flywheel type magneto disclosed and claimed in Jepson and Craft application Serial No. 402,882, filed January 8, 1954, now Patent 2,778,961 and assigned to the same assignee as the present application. Likewise, the internal combustion engine 96 preferably also employs a starting mechanism disclosed and claimed in Vieceli application Serial No. 449,479, filed August 12, 1954, now Patent No. 2,741,235. In order to appreciate the relationship of the internal combustion engine 96 and the rest of the power lawn mower described thus far, a brief description of certain portions of the engine 96 will be included here and a more detailed description thereof included later on in this specification. Referring now to the drawings and more particularly to FIGS. 1, 12, 13, 14, 15 and 16 thereof, the internal combustion engine 96 comprises a crankcase and cylinder housing 97 in which there is disposed a suitable cylinder liner 98. Within this liner 98 there is mounted for reciprocation a piston 99 connected by a suitable connecting rod 99a with a crankshaft 100. Most of these parts are preferably made of lightweight material to insure a lightweight engine. One end of the crankshaft 100 protrudes outside the cylinder housing and the protecting shroud associated therewith, and has secured thereto a suitable pulley 101. The internal combustion engine 96 also includes a camshaft 102 which is gear driven from the crankshaft 100. This is accomplished by virtue of a camshaft gear 103 which meshes with a crankshaft gear 104. The gear ratio of the gears 103 and 104 is such that the camshaft 102 rotates at one-half the speed of the crankshaft 100 and in the opposite direction. The camshaft 102 projects outside of the cylinder housing, as is best shown in FIG. 13 of the drawings.

In accordance with the present invention, the camshaft 102 of the internal combustion engine 96 is drivingly connected with the reel 35. The driving connection between the camshaft 102 and the reel shaft 36 comprises a safety clutch generally designated by the reference numeral 107 (best shown in FIGS. 2 and 13 of the drawings), a sprocket shaft 108 having secured to one end thereof a sprocket 109, and the chain 45 interconnecting the sprockets 44 and 109. This driving connection between the prime mover 96 and the reel 35 is an important feature of the present invention. As was pointed out above, the reel 35 should make a certain number of cuts per inch of travel of the mower, and the conventional internal combustion engine speed is so high that a reduction gear mechanism is necessary in lawn mowers now on the market to reduce the speed. In the present invention use is made of the reduction gearing already present between the crankshaft 100 and the camshaft 102, so that only a very simple chain drive can be employed. As a matter of fact, the sprocket 109 for the chain drive is one having the minimum diameter and the minimum number of teeth usable in such a relationship. Thus, by driving the reel from the camshaft 102 there is obtained a very simple drive without the complicated reduction gearing mechanism heretofore employed. Also, with the interposition of the safety clutch 107 the reel is driven whenever the internal combustion engine is operating, and the safety clutch 107 provides the necessary overload control in the event that for some reason or another the reel should be prevented from rotating. Thus, there has been provided a very simple and direct drive between the camshaft 102 and the reel 35 providing the proper direction of rotation of the reel 35.

For the purpose of preventing one from inadvertently coming into contact with the drive chain 45 or the sprockets 44 and 109, a suitable chain housing 110 is provided, which chain housing is secured at the lower end thereof to the motor mounting plate 90 and is in effect supported thereby. Preferably, a suitable bracket 111 having one end secured to the chain housing 110 and the other end secured to the motor mounting plate 90 is provided to insure proper positioning of the chain housing 110 at all times. Suitably supported by the chain housing 110 is a bearing housing 112 which supports a bearing cushion 113. The bearing cushion 113 in turn supports a suitable sprocket shaft bearing 114. A suitable thrust washer 115 and a retaining ring 116, the latter positioned in a recess 108a of the sprocket shaft 108, take care of any end thrust that may be applied to this sprocket shaft 108.

If for any reason a stick or stone or other impediment should get into the reel 35 and prevent it from rotating, the safety clutch 107 which is provided will supply the necessary slippage to permit the internal combustion engine 96 to operate without rotating the reel 35. This safety clutch or overload control therefore prevents breakage or damage to the mechanism in such case. As illustrated, the safety or slip clutch 107 comprises a clutch drive plate assembly which includes a clutch plate 118a and an associated clutch drive plate hub 118b secured to the camshaft 102, as indicated at 102a. Fastened to the sprocket shaft 108, on the other hand, as by a pin 125, is a suitable hub 119 having secured thereto a fork member 120 adapted to extend through suitable openings in a slip clutch plate 121 thereby drivingly relating the fork 120 and the plate 121. Interposed between the slip clutch plate 121 and a clutch drive plate 118a is a friction washer 122 which provides the friction drive. A suitable clutch fork guard 123 is provided to prevent one from inadvertently coming into contact with the rotating fork 120. To provide selective adjustment of the torque at which the safety clutch 107 slips, there is provided an integral extension 102b on the camshaft 102 to which is secured a slip clutch adjusting nut 124. This extension 102b of the camshaft 102 projects through an opening 121a in the slip clutch plate 121 and by appropriately adjusting the nut 124 the torque transmitted through the safety clutch, and particularly the force supplied to the two faces of the friction washer 122, may be controlled in any desired manner. Thus, there is provided a very simple drive means between the camshaft 102 and the reel 35 which involves the minimum from the standpoint of parts, and furthermore provides the simplest drive that could be obtained short of having the sprocket shaft 108 directly attached to the reel shaft 36.

For the purpose of permitting the operator to guide and control the lawn mower 20 of the present invention, a suitable handle is provided. This handle or handle assembly, as it might better be termed, is designated generally by the reference numeral 126 and comprises two principal elements, namely, a lower U-shaped tubular member 127 which forms the lower handle portion, and an upper handle portion generally designated at 128, which comprises two tubular somewhat L-shaped members 128a and 128b which are suitably welded or otherwise secured closely adjacent the junction point of the arms of the L, as indicated at 129, to provide an integral handle portion. The ends of the upper handle portion 128 remote from the lower portion 127, which comprise the arms of the L-shaped members 128a and 128b, provide the handgrip portions by which the operator may control and guide the lawn mower in a well understood manner. Preferably, these portions are provided with conventional handle bar grips 130 to provide the operator with a more satisfactory means for manipulating the lawn mower. The upper handle portion 128 and the lower handle portion 127 are secured together to form the handle assembly 126 by a handle bracket generally designated at 131, which handle bracket 131 comprises a pair of sheet metal elements or plates 131a and 131b, best shown in FIG. 10 of the drawings. The plates 131a and 131b have cooperating recesses or grooves to receive therein the ends of the tubular members 128a and 128b, and also a portion of the bight of the U-shaped handle portion 127. It will be apparent from FIG. 10 that these cooperating recesses for the handle portion 128 are substantially at right angles to the cooperating recesses for the handle portion 127. The handle bracket portions 131a and 131b are clamped together by suitable fastening means 132 to clamp the same to the handle portions 128a and 128b, cooperating openings being defined within the handle portions 128a and 128b, and the bracket portions 131a and 131b for these fastening means. Likewise, fastening means 133 extend through the bracket portions 131a and 131b, and cooperating openings in the bight portion of the U-shaped member 127. When the fastening means 132 and 133 are rendered effective, the handle portions 127 and 128 are united into a rigid structure.

It will be appreciated that when the angular disposition of the ground roller bracket 70 is changed from the maximum height of cut to the minimum height of cut, the frame assembly 21 will be raised or lowered. Since, as will become apparent from the ensuing discussion, the handle 126 is secured to the frame assembly 21, the handle 126 will be raised and lowered as the height of the cut is adjusted. To provide means whereby the operator may adjust the height of the handle 126 above the ground, the openings in the brackets 131a and 131b for the fastening means 133 are in the form of slots 134 which are disposed at an angle with the longitudinal axis of the bight portion of the U-shaped handle section 127 (see FIG. 10 of the drawings). Thus, by moving the brackets 131a and 131b to the right or to the left, the handle 126 will tend to pivot slightly about the axis of the bight portion 127 thereby providing a substantial change in elevation of the handle bar grips 130 above the ground level.

For the purpose of securing the handle assembly 126, and more specifically the lower handle portion 127, to the lawn mower 20, the ends of the arms of the tubular U-shaped member 127 are flattened, as indicated at 127a, to receive therein a pivot arm 135, one pivot arm 135 being received in each arm of the lower U-shaped handle assembly 127. Except that the pivot arms 135 are designed as right and left pivot arms, they are otherwise identical, and they include an opening 135a therein for pivotally supporting the handle 126 from the frame assembly 21, and additionally include an extension 135b terminating in a knife edge 136, the purpose of which will become apparent from the following description. Preferably, each of the pivot arms is spot welded or otherwise suitably secured to the lower handle portion 127, so that in effect the pivot arms 135 become an integral part of the handle assembly 126, and it is intended to include in the designation "handle assembly 126" the pivot arms 135 as well as the handle portions 127 and 128.

To pivotally connect the handle assembly 126, and specifically the openings 135a defined therein to the frame assembly 21, each frame end 22 and 23 is provided with an integral projection 22b and 23b, respectively. These projections 22b and 23b, which extend in an upward direction, are each provided with a laterally extending pivot pin 137 receivable within the openings 135a of the pivot arms 135. In this way it will be apparent that the handle assembly 126 is secured to the frame assembly 21 in a manner so that the operator may readily guide the mower to the right or to the left, or pull the mower backwardly or push it forwardly. At the same time, however, the handle assembly 126 is pivoted about the pivot pins 137 for a control function to be described hereinafter.

In accordance with the present invention, there is provided an arrangement whereby the ground wheels 26 and 27 may be driven from the prime mover comprising the internal combustion engine 96 by means of friction rollers engageable with the periphery of the semipneumatic tires 30. Although it is appreciated that ground wheels of lawn mowers have been driven by means of friction rollers engaging with the periphery of ground wheels, certain improved results are obtained by the novel arrangement of the present invention. To accomplish this drive, there are supported on the lower handle portion 127 a pair of supports 140, one on each arm of the U-shaped handle portion 127. These supports are thereby secured to the handle assembly 126 at a position closely adjacent the periphery of the tires 30 of the ground wheels 26 and 27, as is clearly shown in FIG. 1 of the drawings. These supports 140, one of which is shown in detail in FIG. 9 of the drawings, comprise a pair of sheet metal plates 141 and 142 having cooperating recesses defined therein to receive the handle portion 127 in a manner similar to the handle bracket 131. Thus, the supports 140 may be clamped by suitable clamping screws 144 to the handle assembly 126. The supports 140 are provided with openings for receiving in each support a bearing 145. Each support 140 supports such a bearing, and these bearings 145 have the openings therein aligned so that a jackshaft 146 may be journalled therein. The jackshaft 146 therefore extends across the U-shaped lower handle portion 127, and the ends of the jackshaft extending beyond the supports 140 are provided with suitable means to secure thereto friction drive rollers 148, one friction drive roller 148 being associated with each end of the jackshaft 146. As illustrated in the drawings, the jackshaft is provided with threaded ends 146a to which are threadedly secured the friction drive rollers 148. It will be understood that right-hand and left-hand threads will be provided for the two ends of the jackshaft 146 so that the rollers 148 will not come loose in use. The design of the friction drive rollers is relatively important, and they preferably are provided on their peripheries with a plurality of longitudinally extending ridges 148a (FIG. 10 of the drawings), the spacing between which ridges is fairly important to give the desired friction drive. It will be apparent that with the jackshaft 146 journalled for rotation in the supports 140 secured to the handle assembly 126, the jackshaft, and specifically the drive rollers 148, will move in an arcuate path about the pivot pins 137, as is readily apparent from the schematic diagram of FIG. 3 of the drawings. As the handle assembly 126 is moved downwardly, resulting in pivotal movement in a clockwise direction about pivot pins 137, as viewed in FIG. 1 of the drawings, the friction drive rollers 148 will move from the dotted line position of FIG. 3 to the solid line position of FIG. 3, in which solid line position these drive rollers 148 are in frictional driving engagement with the semipneumatic tires 30 associated with the ground wheels 26 and 27. If desired, a suitable drive roller guard 150 may be mounted on each of the supports 140 to prevent one from inadvertently contacting the drive rollers 148.

In order that the jackshaft 146 may be rotated by the prime mover 96, there is provided in accordance with the present invention a simple drive connection between the crankshaft 100 and the jackshaft 146. To this end the pulley 101 secured to the crankshaft 100 is drivingly connected by means of a belt 151 (indicated as a V belt), which engages with a suitable pulley 152 secured to the jackshaft 146. It will be apparent that a drive connection between the crankshaft 100 and the jackshaft 146 is again a very simple drive. It will also be apparent that the reel 35 should rotate in a counterclockwise direction, as viewed in FIG. 4 of the drawings, for a proper mowing operation. With the simple drive arrangement disclosed, the camshaft 102 should also rotate in a counterclockwise direction to produce such rotation of reel 35. Since the camshaft 102 rotates in the opposite direction from the crankshaft 100 by virtue of the gears 103 and 104, best shown in FIG. 16 of the drawings, it will be apparent that the crankshaft 100 under these conditions must rotate in a clockwise direction, as viewed in FIG. 1 of the drawings, with the result that the jackshaft 146 also rotates in a clockwise direction. It will, moreover, be apparent from FIG. 1 of the drawings that clockwise rotation of the jack shaft 146, as viewed in FIG. 1 of the drawings, will cause counterclockwise rotation of the ground wheels 26 and 27, which will cause forward motion of the lawn mower as is desired. Thus, in accordance with the present invention, by the very simple drive means between the crankshaft 100 and the jackshaft 146, and between the camshaft 102 and the reel shaft 36, the correct motion of the reel and the drive wheels is obtained. Also, by properly proportioning the pulleys associated with the crankshaft 100 and the jackshaft 146, and the gears associated with the sprocket shaft 108 and the reel 35, the desired speed of the mower over the area to be cut and the desired number of cuts per inch of travel can readily be obtained.

Figure 3:
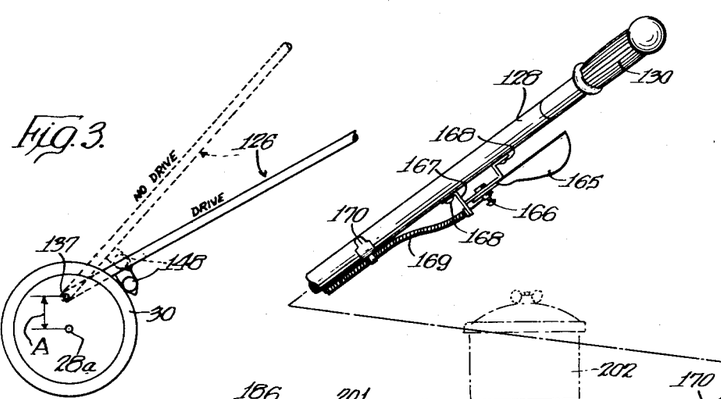
FIG. 3 is a schematic diagram to illustrate the ground wheel drive and no-drive positions of the present invention.

The pivot point comprising the pivots 137 for the handle assembly 126 are displaced a predetermined distance from the axes 28a and 28b of the ground wheels 26 and 27, designated by the distance A in FIG. 3 of the drawings, to give the desired frictional driving relationship between the drive rollers 148 and the tires 30. Obviously, if the pivot points 137 were concentric with the axes 28a and 28b of the ground wheels, the rollers 148 would move in an arc concentric with the periphery of the ground wheels 26 and 27, and no frictional drive could be obtained by manipulation of the handle assembly 126. By offsetting the pivot point for the handle assembly 126, selective movement of the handle assembly 126 causes the frictional rollers 148 to drivingly engage with the periphery of the tires 30. If the displacement A of the pivot point for the handle assembly 126 is too small, then the drive rollers 148 would tend to bite into the tires 30 to too great an extent. On the other hand, with a displacement A which is too great, it would require a very large force to maintain a nonslipping engagement between the rollers 148 and the tires 30. The means for producing this force is described hereinafter. It will be apparent that when the drive rollers 148 are not in driving engagement with the tires 30 associated with the ground wheels, a so-called "freewheeling" arrangement is provided, whereby the rotation of the ground wheels is manually controlled. Thus, there is completely eliminated the requirement of any clutches other than the safety clutch 107. Morevoer, the operator may, by merely manipulating the handle 126, readily cause the ground wheels to be driven or not, as the case may be, which is very desirable when mowing around bushes and other impediments which will be found in the ordinary lawn.

Figure 19:
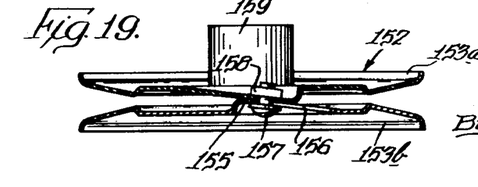
FIG. 19 is a sectional view taken on line 19—19 of FIG. 18.

In view of the belt drive which is employed between the pulley 101 on the crankshaft 100, which has a fixed position, and the pulley 152 on the bodily movable jackshaft 146, the belt 151 will loosen when the handle 126 is moved to the no-drive position, and tighten when the handle 126 is moved to the drive position. In time such a belt may stretch, and, in accordance with the present invention, simple means are provided for eliminating belt slippage in the drive position. To this end the pulley 152, illustrated best in FIGS. 18 and 19, is a pulley made up of several parts and primarily comprising two identical metal stampings 153a and 153b, each having a central shaft opening 154 therein. The adjacent faces of these stampings are deformed to provide a plurality of arcuate interengaging cam surfaces 155. The arcuate cam surfaces for the stamping 153b are provided with arcuate slots 156, while small openings are provided in stamping 153a to accommodate screws 157. Preferably, nuts 158 are welded to the outer face of stamping 153a so that the two stampings may be clamped together to form the pulley 152 by screws 157 extending through slots 156 engaging nuts 158. A hub 159 is preferably welded to one of the stampings, as illustrated in FIG. 19. By loosening the screws 157 and producing relative rotation between the stampings 153a and 153b, the interengaging arcuate cam faces 155 cause the pulley faces to move apart or together, thereby effectively increasing or decreasing the diameter of the pulley 152 with the resultant tightening or loosening of the belt, as the case may be.

From the above description it will be noted that the drive connection of the ground wheels 26 and 27 is obtained by pushing downwardly on the handle 126. This is a desirable feature, since in the relaxed position the operator will tend to somewhat lean on the handle 126, which results in a downward force being applied to the mower handle, hence insuring a continued drive arrangement, with the result that the mower 20 somewhat pulls him along. When freewheeling is desired, the operator merely lifts the handle upwardly, thus disengaging the drive connection.

In order to provide some means for maintaining the handle for the lawn mower 20 in either the drive or the no-drive position, as selected by the operator, and furthermore to reduce to a minimum the force required to move from the drive to the no-drive position and vice versa, there is provided an overcenter spring mechanism which is interposed between the handle assembly 126 and the frame assembly 21. It has already been pointed out that the pivot arms 135 were each provided with a lateral extension terminating in a knife edge 136. A cooperating knife edge 160 is secured to each frame end 22 and 23, as by suitable rivets 161. Thus, at each frame end there are provided two knife edges extending toward each other, as best shown in FIG. 4 of the drawings. A pair of suitable U-shaped springs 162 are provided, one for each end of the frame assembly 21, with the arms of the U-shaped springs engaging the knife edges 136 and 160, thus providing an overcenter spring arrangement, the two positions of which are readily apparent from an examination of FIGS. 4 and 6 of the drawings. The handle assembly 126 then tends to assume either the position of FIG. 4 of the drawings, which is the no-drive position, or the position of FIG. 6 of the drawings, which is the drive position.

It was pointed out above that if the displacement A of FIG. 3 was too great, a very large force would be necessary to maintain a nonslipping engagement between the drive rollers 148 and the tires 30 in the drive position, thus requiring very strong springs 162. This might result in actually pivoting the mower about the ground roller 74 in one case, or about the ground wheels 26 and 27 in the other case, rather than pivoting the handle assembly about its pivot points 137 as is desired. By choosing the correct displacement A, a relatively small spring force supplied by the springs 162 will be satisfactory. Although with the arrangement described the drive rollers 148 are to the rear of the axes of the ground wheels 26 and 27, it will be apparent that they could be supported on the handle assembly 126 or an extension thereof to the front of the ground wheel axes.

It is essential that means be provided to limit the extreme positions of the handle assembly 126, particularly in view of the overcenter spring arrangement provided by the springs 162. To this end the frame ends 22 and 23 of the frame assembly 21 are each provided with an integral upwardly projecting hook-shaped portion 22c and 23c, respectively. One of these, namely, the one associated with the frame end 22, is clearly shown in the enlarged sectional view of FIG. 5 of the drawings. As there illustrated, the hook-shaped portion 22c engages the extension 135b of the pivot arm 135 which terminates in the knife edge 136, thereby limiting the upward movement of the handle assembly 126. This hook-shaped portion 22c, and the same applies to the hook-shaped portion 23c, further includes a shoulder 22d or 23d, depending upon which frame end of the frame assembly is considered, and limits the lowermost position of the handle assembly 126. The portions 22c and 23c and the shoulders 22d and 23d thus define stop members for limiting the pivotal movement of the handle. These two extreme positions are shown in FIG. 5 of the drawings by solid and dotted lines, respectively.

From the above description it will be apparent that the operator can control the application of power to the lawn mower merely by manipulating the handle assembly 126. The only other control which the operator requires is a throttle control for the prime mover or internal combustion engine 96. As illustrated in FIGS. 1, 4 and 10 of the drawings, there is suitably mounted to the handle assembly 126 adjacent the handle bar grips 130 a throttle lever 165 which may be pivotally mounted as indicated at 166. This throttle lever may be associated with a suitable supporting mechanism indicated at 167 and secured to the handle assembly 126, as indicated at 168. Preferably, the throttle lever 165 is connected by means of a Bowden wire or cable 169 with suitable throttle control means associated wtih the prime mover or internal combustion engine 96. If desired, suitable cable clips 170 may be provided along the handle assembly to secure the Bowden wire 169 thereto and prevent it from interfering with the lawn mower or the operator. It will be understood that any other suitable means for connecting the throttle lever 165 with the throttle control means of the prime mover may be employed.

In order to better describe the details of the lightweight engine 96 employed with the lawn mover 20 of the present invention, reference should now be had to FIGS. 12 to 17 of the drawings. As there illustrated, the crankcase and cylinder housing 97 terminate in a base including lateral flanges 180 for receiving the fastening means for securing the internal combustion engine 96 to the motor mounting plate 99, as described above. Mounted on the crankshaft 100 outside the cylinder housing 97 is a combined flywheel and magneto, generally designated by the reference numeral 181, which forms no part of the present invention but is disclosed and claimed in the copending Jepson and Craft application referred to above. Also associated with the crankshaft 100 outside the housing 97 is a starter mechanism generally designated by the reference numeral 182 which also forms no part of the present invention but is disclosed and claimed in the copending Vieceli application referred to above. It will be noted from the drawings that a starting cable 183 forming a part of the starting mechanism 182 extends through an opening in a motor shroud 184 associated with the housing 97 through a starting cable bushing 185 and terminates in a suitable handle 186 to which the cable 183 is secured. To start the engine 96, the operator pulls on the handle 186.

It will be apparent that the shroud 184 more or less completely encloses the upper part of the internal combustion engine primarily to prevent the operator from coming in contact with the flywheel and magneto assembly 181, the starting mechanism 182 and the like. This shroud 184 is provided with an opening 187 through which the crankshaft 100 extends. To prevent the operator from inserting his hand or a tool into this opening while the internal combustion engine 96 is operating, there is provided a flywheel screen 188 which is secured to rotate with the crankshaft 100 and the pulley 101 within the opening 187. This screen 188 substantially closes the opening 187 as far as the entry of a foreign object is concerned, but is provided with a plurality of openings 189 through which cooling air may be drawn. It may be observed from FIG. 15 of the drawings that the rotating screen 180 is closely adjacent the V groove in the pulley 101. With this arrangement the V belt 151, driven by the pulley 101, rubs against the screen 188 and prevents grass or other foreign particles from remaining there to close the openings 188.

The internal combustion engine 96 includes the conventional valves controlled by the camshaft 102. As illustrated, the camshaft 102 manipulates a pair of valve lifters 190 and 191, the lifter 190 being clearly shown in FIG. 16 of the drawings, and a portion of both lifters being shown in FIG. 17 of the drawings. These lifters are identical. As illustrated, the lifters 190 and 191 control an intake valve 192 and an exhaust valve 193, respectively. These valves are suitably mounted within the cylinder housing 97 in a conventional manner, as clearly shown in FIGS. 16 and 17 of the drawings, the intake valve 192 being arranged to control the intake of fuel from a carburetor 195, and the exhaust valve 193 being designed to control the exhaust of gases to an exhaust muffler 196. Since the construction of the intake valve forms no part of the present invention, no further discussion thereof is included herewith.

Associated with the internal combustion engine 96, which is a single cylinder engine, is the conventional spark plug 197, which is electrically connected by means of a conductor 198, with the magneto forming a part of the flywheel magneto 181 and including a coil portion disposed within a coil cover 199 to which the conductor 198 extends. The internal combustion engine also includes a short circuit leaf 200 for short-circuiting the spark plug 197 when it is desired to stop the engine. The conventional gas tank 201 provides the source of fuel for the carburetor 195, and an air cleaner 202 further completes the engine. The internal combustion engine 96, which may be constructed from lightweight metals such as aluminum, is a great deal lighter than internal combustion engines heretofore available on the market having a comparable power output. As a result of the lightness of the internal combustion engine 96, the frame assembly 21 need not be as strong, and the over-all weight of the lawn mower is substantially less than that of conventional power lawn mowers.

In view of the detailed description included above, the operation of the power lawn mower of the present invention will readily be understood by those skilled in the art. By using both the camshaft and the crankshaft of the prime mover or the internal combustion engine as two sources of power for driving the reel and ground wheels, a very simple drive arrangement is provided. It will be understood that, although the cutting means is driven from the camshaft and the ground wheels are driven from the crankshaft, the opposite arrangement might be employed in certain situations. There has been provided a snap acting freewheeling arrangement which gives maneuverability to the operator with a minimum of effort. By moving the handle of the lawn mower up or down, the drive rollers are disengaged or engaged with the wheels. There are no levers to push and no knobs to turn. The whole mechanism is very simple and yet sure and safe to operate. Whether the device is in "freewheeling" or in "drive," the cutting means is continuously operative so that the operator may guide the lawn mower smoothly and easily around obstructions just as one would a hand mower, except that the cutting means is operative. This makes trimming under bushes, around trees, fences and places that are hard to get at very simple as contrasted with other conventional power mowers. The entire mechanism is easy to adjust as far as the height of cut is concerned, and the whole mechanism comprises few parts which are easy to assemble and maintain in adjustment.

While there have been illustrated and described certain particular embodiments of the present invention, it will be understood that various changes and modifications of the invention will occur to those skilled in the art. It is aimed in the appended claims to cover all such changes and modifications as fall within the true spirit and scope of the present invention.

What is claimed as new and desired to be secured by Letters Patent of the United States is:

1. A lawn mower of the power type comprising a pair of ground wheels, support means carried by said ground wheels, a prime mover mounted on said support means, a cutting element rotatably mounted on said support means, said prime mover and the axis of rotation of said cutitng element being fixed relative to each other and relative to said support means, driving mechanism for directly interconnecting said prime mover and said cutting element, handle means pivotally connected to said support means, stop members for limiting the pivotal movement of said handle means relative to said support means, a rotatable shaft supported for rotation by one of said means and disposed in spaced parallel relationship with the axes of said ground wheels, said shaft being so supported by one of said means that pivotal movement of said handle means causes said shaft to move toward and away from the axis of said ground wheels, means drivingly connecting said shaft to said prime mover, and friction drive members rotatable with said shaft and engageable with said ground wheels to drive the latter in one position of said handle means relative to said support means.

2. In a lawn mower of the power type the combination of a pair of ground wheels, support means carried by said ground wheels, a prime mover mounted on said support means, a cutting element rotatably mounted on said support means, said prime mover and the axis of rotation of said cutting element being fixed relative to each other and relative to said support means, driving mechanism directly interconnecting said prime mover and said cutting element, handle means pivotally connected to said support means, a rotatable shaft supported for rotation by one of said means and disposed in spaced parallel relationship with the axes of said ground wheels, said handle means being pivoted to said support on an axis displaced from the axes of said ground wheels, said ground wheels, handle means and support means being so related that pivotal movement of said handle means causes relative movement between said shaft and the axis of said ground wheels, means drivingly connecting said shaft to said prime mover, and friction drive members rotatable with said shaft and engageable with said ground wheels to drive the latter in one position of said handle means relative to said support means.

3. The lawn mower of claim 2 in which means causing said handle means to move to either one of two extreme positions relative to said support means are provided.

4. The lawn mower of claim 2 wherein said one position of the handle means is the lower position thereof.

5. A lawn mower of the power type comprising a pair of ground wheels, support means carried by said ground wheels, a prime mover mounted on said support means, a cutting element rotatably mounted on said support means, driving mechanism directly interconnecting said prime mover and said cutting element, handle means pivotally connected to said support means, stop members for limiting the extreme pivotal movements of said handle means relative to said support means, an over-center spring acting between said handle means and said support means to cause said handle means to move toward either one or the other of its extreme positions, a rotatable shaft supported for rotation by said handle means and disposed in spaced parallel relationship with the axes of said ground wheels, said handle means being pivotal about an axis displaced by a predetermined amount from the axes of said ground wheels whereby pivotal movement of said handle means causes said shaft to move toward and away from said axis of said ground wheels, means drivingly connecting said shaft to said prime mover, and friction drive members rotatable with said shaft and engageable with said ground wheels to drive the latter in the lower position of said handle means relative to said support means.

6. A lawn mower of the power type comprising a pair of ground wheels, support means carried by said ground wheels, a prime mover mounted on said support means, a cutting element rotatably mounted on said support means, driving mechanism directly interconnecting said prime mover and said cutting element, handle means pivotally connected to said support means for pivotal movement about an axis disposed a predetermined distance from the axes of said ground wheels, a stop member for limiting the extreme upward movement of said handle means relative to said support means, a rotatable shaft supported for rotation by said handle means to the rear of the axes of said ground wheels and disposed in spaced parallel relationship with the axes of said ground wheels, means drivingly connecting said shaft to said prime mover, friction drive members rotatable with said shaft and engageable with said ground wheels to drive the latter when said handle means is moved downward relative to said support means, cooperating knife edge members on said handle means and support means, and U-shaped spring means engageable with said knife edge members to cause said handle means to move toward one of its extreme positions.

7. In a power lawn mower having ground wheels, the combination of a support on said ground wheels, cutting means rotatably mounted on said support, a handle connected to said support mounted for limited pivotal movement about a horizontal axis perpendicular to the normal line of travel of said mower during a grass cutting operation, said handle comprising a U-shaped portion with each arm of the U pivotally connected to said support, a pair of bearings one supported from each arm of said U-shaped portion, a shaft journalled in said bearings and disposed generally parallel with the axes of said ground wheels and on the handle side of said ground wheels, friction means connected to the ends of said shaft, said bearings being positioned so that downward movement of said handle causes said friction means drivingly to engage the periphery of said ground wheels, a prime mover mounted on said support, means drivingly interconnecting said prime mover with said grass cutting means, and means independent of said last mentioned means for drivingly connecting said prime mover and said shaft.

8. A power lawn mower comprising ground wheels, a support on said ground wheels, a handle connected to said support mounted for limited pivotal movement about a horizontal axis perpendicular to the normal line of travel of said mower during a grass cutting operation, said handle comprising a U-shaped portion with each arm of the U pivotally connected to said support, a pair of aligned bearings one supported from each arm of said U-shaped portion with a line interconnecting said bearings being generally parallel with the axes of said ground wheels and on the handle side of said ground wheels, a shaft journalled in said bearings, friction means driven from the ends of said shaft, said bearings being positioned so that downward movement of said handle causes said friction means drivingly to engage the periphery of said ground wheels, a prime mover mounted on said support, means drivingly connecting said prime mover and said shaft, grass cutting means mounted on said support, and separate driving means interconnecting said grass cutting means and said prime mover.

9. The lawn mower of claim 2 wherein said relative movement between said shaft and the axis of said ground wheels comprises movement of said shaft toward and away from the axis of said ground wheels.

10. A power lawn mower having a handle secured thereto, said handle comprising a U-shaped member secured to said mower and a rearwardly extending element, said U-shaped member including a tubular bight portion, said rearwardly extending element having a portion clamped around said tubular portion, means for adjusting the height of cut of said lawn mower with resultant changes in the height of the most rearward portion of said handle above the ground, and means selectively adjusting the height of said most rearward portion by relative pivotal movement between said tubular portion and the portion of said element clamped around said tubular portion.

11. The power lawn mower of claim 10 wherein said last-mentioned means comprises elongated slots in said element disposed at an angle with respect to the longitudinal axis of said tubular portion.

References Cited in the file of this patent

UNITED STATES PATENTS

| | | |
|---|---|---|
| 1,022,291 | Anthony | Apr. 2, 1912 |
| 1,819,791 | Reed | Aug. 18, 1931 |
| 1,830,862 | Townsend | Nov. 10, 1931 |
| 1,889,931 | Motsinger | Dec. 6, 1932 |
| 2,247,333 | Funk | June 24, 1941 |
| 2,269,920 | Seaver | Jan. 13, 1942 |
| 2,329,952 | Speiser | Sept. 21, 1943 |
| 2,335,054 | Godwin | Nov. 23, 1943 |
| 2,388,165 | Loewe et al. | Oct. 30, 1945 |
| 2,484,795 | Schofield | Oct. 11, 1949 |
| 2,547,401 | Loewe et al. | Apr. 3, 1951 |
| 2,623,603 | Cutlan et al. | Dec. 30, 1952 |
| 2,662,416 | Simonsen et al. | Dec. 15, 1953 |
| 2,736,389 | Phelps | Feb. 28, 1956 |
| 2,746,307 | Zatko | May 22, 1956 |